Dec. 31, 1968 W. B. ROBBINS ET AL 3,419,487
METHOD OF GROWING THIN FILM SEMICONDUCTORS
USING AN ELECTRON BEAM
Filed Jan. 24, 1966

INVENTORS.
Edward L. Kern
William B. Robbins
BY
Howard W. Hermann
ATTORNEY

United States Patent Office 3,419,487

Patented Dec. 31, 1968

3,419,487

METHOD OF GROWING THIN FILM SEMICONDUCTORS USING AN ELECTRON BEAM

William B. Robbins, Cambridge, Mass., and Edward L. Kern, Midland, Mich., assignors to Dow Corning Corporation, Midland, Mich., a corporation of Michigan Filed Jan. 24, 1966, Ser. No. 522,580

3 Claims. (Cl. 204—164)

The present invention relates to growth of thin film semiconductors and more particularly to improved methods and apparatus for forming semiconductor films on substrate.

It is known that thin films of compound semi-conductors such as cadmium sulfide may be grown by such means as vacuum evaporation and vapor reaction or reactive sputtering on a heated substrate. Such films are presently used in solar cells, thin film field effect transistors and other devices. It is also known that thin layers of elemental semiconductors such as silicon and germanium may be formed by thermal decomposition on a heated substrate of halogenated compounds of these elements.

While presently known techniques are suitable for certain types of substrates and applications, several disadvantages are inherent in these techniques. Many substrates which would have apparent advantages cannot be used because of the temperatures required for thin film deposition. It is difficult to obtain uniform coating thickness over large areas and to control deposition areas. The yield in terms of material costs and equipment maintenance costs is quite low. Stoichiometry is also a problem with many compounds and must be maintained within close limits if the characteristics of the device are not to be adversely affected.

An object of the present invention is to provide a method and apparatus for depositing thin semiconductor films without the disadvantages inherent in prior art techniques.

A further object is the provision of a method and apparatus, suitable for use in continuous production for depositing thin semiconductor films.

In accordance with these and other objects there is broadly provided by the present invention a method for depositing semiconductor films wherein deposition from a vapor phase is enhanced by electrical means. In accordance with the invention, a gas containing the elements of the desired semiconductor material, either in elemental or compound form, is caused to react to form the desired compound by the application of electrical energy in the form of an electron beam or glow discharge, for example. This allows deposition on unheated substrates as well as providing for better control of film thickness and allowing deposition in only selected areas of the substrate. Further, it in possible to adapt such systems quite easily to mass production techniques.

Figure 1:
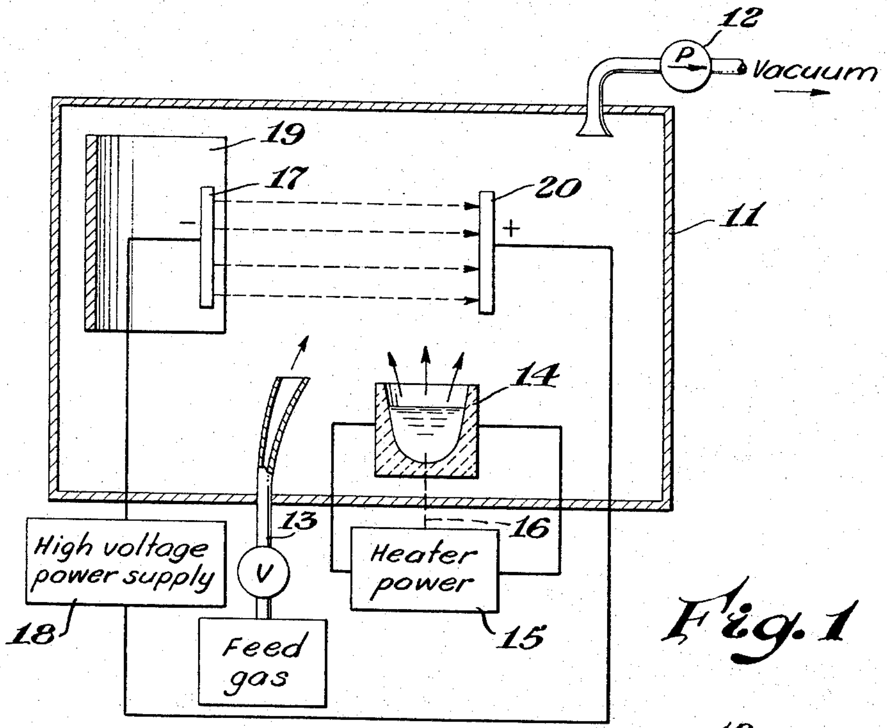
Figure 2:
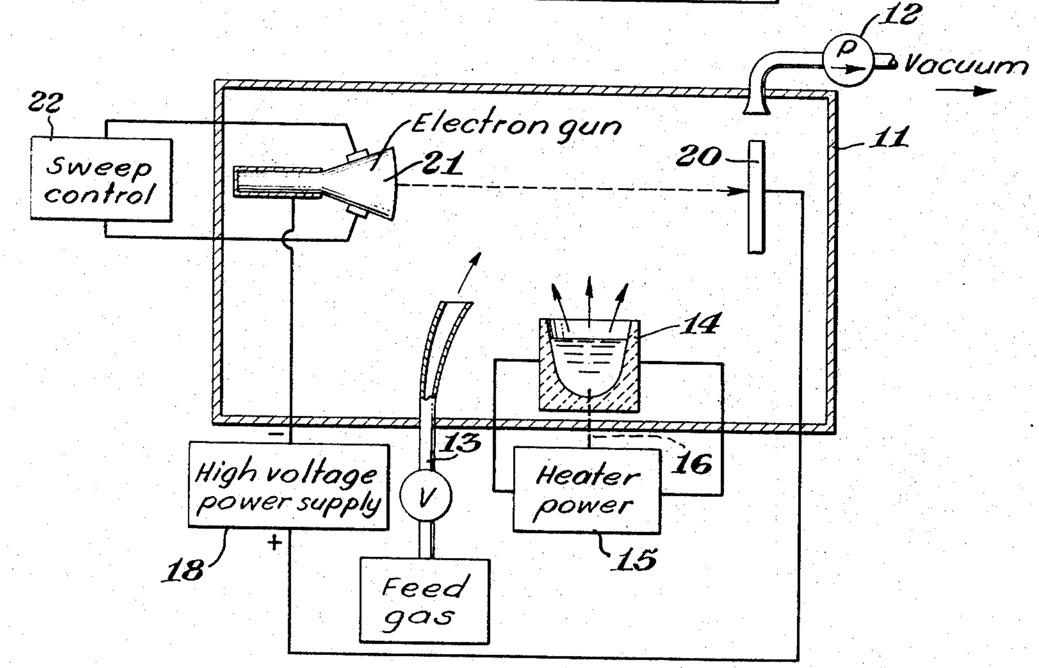

Other objects and attendant advantages of the present invention will become obvious to those skilled in the art by a consideration of the following detailed description when read in connection with the accompanying drawings wherein:

FIG. 1 is a diagrammatic view of a deposition system made in accordance with the present invention and utilizing electron discharge to enhance the deposition, and FIG. 2 is a diagrammatic view of apparatus similar to FIG. 1, but utilizing electron beam techniques to enhance the deposition.

Referring now to the drawings wherein like or corresponding reference characters designate like or corresponding parts throughout the figures thereof, there is shown in FIG. 1 a reaction chamber 11 having associated therewith evacuating means such as vacuum pump 12 or the like.

In accordance with the invention the reaction chamber is preferably of extremely chemically inert material to prevent contamination of the semiconductor materials being formed therein, and in any case must be non-reactive with respect to any of the materials placed or formed therein. Glass or quartz are generally preferred.

Depending on the types of raw materials to be used in the deposition process one or more feed gas system 13 and/or one or more crucibles 14, or other solid materials sources, are provided for introducing the necessary raw materials for the deposition process into the reaction zone. The crucible 14 preferably has associated with it heating means comprising a power source 15, and control means 16 for controlling the power supplied for heating and, thereby, the temperature of the crucible contents. Although the heating means as shown utilize the resistance of the crucible, it is also possible to supply heat by means such as separate heaters, high frequency heating or any other suitable means known in the art. The temperature control system may also be of any suitable known type such as those utilizing infrared or thermocouple sensing devices to feed back signals to control the heater power source 15. Depending on the type of raw material used, it is also possible in some cases to utilize a solid piece of raw material without a crucible or similar holding means.

Mounted within the reaction chamber 11 is a cathode 17 connected to the negative potential side of a high voltage supply 18. Preferably a directive shield 19 of electrically conductive material is also provided to prevent electrons from leaving the cathode in stray directions. The positive side of the high voltage supply 18 is connected to the substrate 20 to be coated or to an electrically conductive backing member associated therewith. Accordingly, the substrate may be either a conductor, a semiconductor or an insulator. The substrate face which is to be coated is placed in a position directly facing the cathode 17.

In operation the reactive raw materials are introduced to the reaction chamber and vaporized in the event that the materials are not in gaseous form upon introduction. The vapor then contains the necessary elements for deposition of the desired material on the substrate 20. A potential difference high enough to cause a glow discharge between the cathode 17 and the substrate 20 is then applied to the system by means of the high voltage supply 18.

Electrical conductivity of gases is usually quite low. If an electric field is established in the gas the conductivity may be increased by many orders of magnitude if dark discharge, glow discharge, or arc discharge are obtained. These depend on the field strength and the resulting current flow. For purposes of the present invention the glow discharge range is generally preferable since the voltage is virtually constant over the entire glow discharge region which is not true of the dark discharge region. This characteristic provides for more uniform deposition. The glow discharge begins initially over only a small area of the cathode and increases in area with increasing current until the entire cathode is covered. Thus, by shaping the cathode or substrate to produce slightly higher field strengths in certain areas glow discharge may be maintained in those areas alone, if desired, during a part or all of the process, and by increasing power input the glow region may be spread over a larger area of the cathode and substrate. This makes the system readily adaptable to control of deposition in predetermined areas. Once the breakdown voltage region is reached and arcing begins, the deposition again becomes irregular and difficult to control.

The reaction to produce the deposited semiconductor material in the glow discharge is apparently the result of ionization and energization supplied by the electric field and current flow between the electrodes. The electrons passing from cathode to anode are being continuously accelerated in the glow due to the positive charge on the substrate. Thus, although some of their energy is transferred to the reactive gas mixture, in the course of their travel between electrodes each time they collide with a gas molecule, they again quickly regain energy due to the electric field. Thus, the energy of the electron is restored, at least in part after each collision, so that further energy is available for transfer upon the next collision. The energy supplied to the gas by electron collision raises the reactants to sufficiently high energy levels for reaction to take place without heating of the substrate which was heretofore required. This allows deposition on substrates unable to withstand the temperatures necessary for chemical reaction without electrical enhancement. If desired, however, auxiliary heating may be employed together with the glow discharge to provide still greater energy for chemical reaction. The amount of heat which can be supplied to the substrate, however, is dependent upon the substrate material.

In an operative embodiment of the aforedescribed glow discharge apparatus hydrogen sulfide was fed into the reaction chamber as a feed gas and pure cadmium was placed in the reaction chamber. The cadmium was in pellet form and of a purity of 99.999+%, and was first cleaned in a mixture of one part 70% nitric acid solution and 10 parts deionized water. The cadmium was then placed in a tantalum crucible in the reaction chamber. A glass substrate was provided on a tantalum electrode. The temperature of the cadmium containing crucible was monitored with an iron-constantan thermocouple spot welded to the tantalum surface. Tantalum direction plates were provided to partially surround an aluminum cathode. The cathode to substrate spacing was 5 mm.

The reaction chamber was held at a pressure of 80–90 microns of mercury. The cadmium was heated to a temperature of 217° C. and a voltage of —1470 volts was applied between cathode and substrate with a measured ionizing current of 0.29 ma. during glow discharge. The system was run for 2.2 hours. A growth rate of cadmium sulfide of 0.0021 g. per hour was achieved.

There is shown in FIG. 2 of the drawing a variation of the system shown in FIG. 1. In this embodiment of the invention, an electron beam is used instead of glow discharge to supply energy to cause reaction. The electron beam is produced by means of an electron gun 21 designed to direct a beam on the substrate 20. By means of a sweep control circuit 22 associated with the gun 21, the beam may be used to deposit the semiconductor material on desired areas of the areas of the substrate in any desired pattern. Although not shown on the drawing, for the sake of simplicity, it is often desirable to place the electron gun in a differentially pumped chamber in the reaction chamber or to use a Lenard window in order to provide greater electron acceleration.

The theory of operation of the electron beam system is quite similar to that of the glow discharge system. The electrons emitted by the electron gun collide with gas molecules in the reaction zone imparting energy to the molecules causing ionization and reaction on the substrate surface.

In the production of cadmium sulfide from cadmium and $H_2S$, cadmium was evaporated onto the unheated substrate, as heretofore described with respect to the glow discharge apparatus and technique, in the presence of an $H_2S$ atmosphere at about 50 microns of mercury pressure. Simultaneously the electron beam was focused in the areas where reaction was desired and cadmium sulfide was formed in those areas. For very thin films it is also possible to deposit a layer of cadmium on the substrate prior to placing the substrate in the reaction chamber and reacting the already deposited cadmium with $H_2S$ as set forth above. Deposited, unreacted cadmium is then removed from the other areas of the substrate by selective etching. The beam current was found to be dependent on pressure, probably because of the increased electron-molecule interaction at increased pressure. At the 50 microns of mercury referred to above, a minimal beam current of $1.2 \times 10^{-6}$ amp. produced satisfactory cadmium sulfide on the substrate, although currents on the order of 0.5 amp. at an energy of 30 e.v. are preferred.

For mass production cadmium can be continuously fed into the system in the form of thin wire which is vaporized at its tip by radio frequency heaters. At sufficiently high beam currents an electron beam can be used to vaporize the cadmium and at the same time ionize the hydrogen sulfide. Continuous deposition may be made on a moving substrate for quantity production. Since the substrate need not be heated in the process, plastic substrates which may be unrolled and fed through the reaction zone in the form of a moving web which may be utilized for some purposes. The methods disclosed herein may be utilized to provide epitaxial layers on semiconductor substrates as well as thin film semiconductors on insulating or conducting substrates. If desired, the substrate surface can be masked to provide for deposition on the substrate only in selected areas.

The method and variations thereof disclosed above have been described for purposes of example with respect to production of cadmium sulfide films. By similar techniques any of the semiconductor compounds chosen from Groups II and VI or Groups III and V of the Periodic-Table may also be formed. These include, for example, the selenides, and tellurides of cadmium and zinc and the antimonides and arsenides of gallium and indium, among others.

For deposition of elemental semiconductor films such as silicon and germanium, similar techniques can also be used using known reactants such as, for example, halides or sulfides and either electrically enhanced decomposition techniques or electrically enhanced reactive sputtering techniques.

In addition to the glow discharge and electron beam techniques electrical enhancement of reaction and deposition may take place by means of either direct current or high frequency alternating current plasmas, formed, for example, in an inert ionizable carrier such as argon. The electrical energy transferred to the plasma is then transferred from the plasma to the reactant materials to cause the desired reaction.

Very thin films of intermetallic compounds can be formed by depositing a thin layer of the metallic element on the substrate and then passing a vapor containing the second element over the substrate and energizing the vapor by electrical means as heretofore described. In general, any of the disclosed variations are suitable for forming any compounds which can be formed by known reactions requiring heat. The electrical energy of the present process is a substitute for heating of the substrate in prior art processes.

Various other modifications and variations of the present invention will become obvious to those skilled in the art from a consideration of the foregoing. It is to be understood therefore that within the scope of the appended claims the invention may be practiced otherwise than as specifically described.

That which is claimed is:

1. A method of forming on a substrate thin films of semiconductor materials consisting of at least one intermetallic compound selected from the class consisting of cadmium sulfide, cadmium selenide, cadmium telluride, zinc sulfide, zinc selenide, zinc telluride, gallium antimonide, gallium arsenide, indium antimonide, and indium arsenide which comprises:

depositing a layer of the metallic element of said intermetallic compound selected from the class consisting of cadmium, zinc, gallium, and indium on said substrate, passing a vapor containing the other element of the desired intermetallic compound selected from the class consisting of sulfur, selenium, tellurium, antimony, and arsenic over the surface of said substrate, and passing through said vapor an electron beam of sufficient intensity to cause reaction of said elements and deposition on said substrate.

2. A method as defined in claim 1 and further comprising sweeping said electron beam over selected areas of said substrate to cause formation of said intermetallic compound in only said selected areas.

3. A method as defined in claim 1 wherein said layer consists of cadmium which is deposited on said substrate and vapor consists of hydrogen sulfide which is ionized by said electrical energy to cause reaction of the sulfur with said cadmium on said substrate forming cadmium sulfide.

References Cited

UNITED STATES PATENTS

| | | | |
|---|---|---|---|
| 2,157,478 | 5/1939 | Burkhardt et al. | 204—192 |
| 2,292,914 | 8/1942 | Wesch | 204—192 |
| 3,119,707 | 1/1964 | Christy | 204—192 |
| 3,329,601 | 7/1967 | Mattox | 204—192 |

ROBERT K. MIHALEK, *Primary Examiner.*

U.S. Cl. X.R.

117—212, 33.5, 93.3, 106; 204—192